(12) United States Patent
Omori et al.

(10) Patent No.: US 7,467,395 B2
(45) Date of Patent: Dec. 16, 2008

(54) DISC DRIVE DEVICE

(75) Inventors: Kiyoshi Omori, Tokyo (JP); Yuji Suzuki, Kanagawa (JP); Takashi Ootsuka, Kanagawa (JP); Keiji Jitsukawa, Chiba (JP); Satoshi Muto, Chiba (JP); Koji Natsubori, Chiba (JP); Hidekuni Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 443 days.

(21) Appl. No.: 11/261,517

(22) Filed: Oct. 31, 2005

(65) Prior Publication Data

US 2006/0095926 A1    May 4, 2006

(30) Foreign Application Priority Data

Nov. 1, 2004   (JP) .............................. 2004-318590

(51) Int. Cl.
*G11B 17/04* (2006.01)
(52) U.S. Cl. ...................... 720/622; 720/619
(58) Field of Classification Search ................. 720/617, 720/619, 622, 623
See application file for complete search history.

(56) References Cited

U.S. PATENT DOCUMENTS

| | | | | |
|---|---|---|---|---|
| 4,674,079 A | * | 6/1987 | Agostini | ...................... 720/623 |
| 6,449,234 B1 | * | 9/2002 | Ahn et al. | .................... 720/619 |
| 6,512,730 B1 | * | 1/2003 | Lee et al. | ..................... 720/622 |
| 6,880,160 B1 | * | 4/2005 | Lee et al. | ..................... 720/623 |
| 6,968,559 B2 | * | 11/2005 | Tsung-Jung | ................. 720/623 |
| 7,284,251 B2 | * | 10/2007 | Lin | ............................. 720/623 |
| 2004/0205789 A1 | * | 10/2004 | Tsung-Jung | ................ 720/619 |
| 2005/0076350 A1 | * | 4/2005 | Lin | ............................ 720/622 |

* cited by examiner

*Primary Examiner*—William J Klimowicz
(74) *Attorney, Agent, or Firm*—Oblon, Spivak, McClelland, Maier & Neustadt, P.C.

(57) ABSTRACT

A disc drive device which can discharge a disc in an optimum discharge amount in the disc drive device dealing with discs having different thickness and weight. A disc drive device including a disc conveying mechanism formed with a supporting portion to support the optical disc, and having a plurality of arms rotatably supported in the housing, and an energizing member for rotatably energizing the plurality of the rotary arms in a predetermined direction, and conveying the optical disc between a disc mounting position for holding the optical disc inserted into the housing in the disc holding portion and a disc insertion/removal position for inserting/removing the optical disc, the top cover having a control portion for controlling a rotary region of the plurality of rotary arms which energizes the optical disc in the discharging direction by contact with the plurality of rotary arms supporting the outer peripheral surface of the disc.

2 Claims, 12 Drawing Sheets

DISC DRIVE DEVICE

CROSS REFERENCES TO RELATED APPLICATIONS

The present invention contains subject matter related to Japanese Patent Application JP 2004-318590 filed in the Japanese Patent Office on Nov. 1, 2004, the entire contents of which being incorporated herein by reference.

BACKGROUND OF THE INVENTION

1. Field of the Invention

The present invention relates to a disc drive device for recording and/or reproducing an information signal to/from an optical disc, and more particularly to a slot-in type disc drive device.

2. Description of the Related Art

As an optical disc, an optical disc, such as a CD (Compact Disc), a DVD (Digital Versatile Disc), a magneto-optical disc, such as an MO (Magneto optical), an MD (Mini Disc), etc. are, heretofore, known widely. Various disc drive devices corresponding to these discs, disc cartridges, etc., are appeared.

The disc drive device includes a type for mounting a disc directly on a turntable by opening a cover or a door provided in a housing, a type for automatically mounting a disc on a turntable when a disc tray is drawn by placing the disc in the disc tray horizontally outputted from and inputted into a housing, and a type for mounting a disc directly on a turntable provided in this disc tray, and so on. However, any of the above types require operations of opening or closing the cover or the door, inputting and outputting the disc tray, and mounting the disc on the turntable.

On the other hand, there is so-called a slot-in type disc drive device which automatically mounts a disc on a turntable merely by inserting the disc from a disc insertion/removal slot provided on the front surface of a housing. When the disc is inserted from the disc insertion/removal slot in this disc drive device, operations below are performed. That is, a loading operation of drawing the disc inserted from the disc insertion/removal slot into the housing by rotating a pair of guide rollers in a reverse direction with each other while sandwiching the disc between the pair of the guide rollers opposed to one another, and an ejection operation of discharging the disc from this disc insertion/removal slot to the exterior of the housing, are performed.

Incidentally, a mobile device in which the disc drive device is mounted, such as, for example, a notebook-sized personal computer, etc., is required to be further small in size, lightweight and thin. Accordingly, the demand for a small, lightweight and thin disc drive device is increased. Further, recently, the demand for a slot-in type disc drive device having good sense of operation is increased as compared with a tray type disc drive device which has been a main stream in a personal computer, etc.

However, in the slot-in type disc drive device, since the length of the above-mentioned pair of guide rollers becomes longer than the diameter of the disc, the size of the entire device in a width direction becomes long. Also, the disc is sandwiched between the pair of the guide rollers. Therefore, the size in the thickness direction becomes long. Therefore, the conventional slot-in type disc drive device has a disadvantage for a miniaturization and thinning.

Particularly, an ultra-thin type disc drive device to be mounted in a notebook-sized personal computer, etc., having a thickness of 12.7 mm is a standard size. Further, when the disc drive device is reduced in thickness to 9.5 mm that is a thickness equivalent to the hard disc drive (HDD) unit, it is very difficult to divert the guide rollers structurally.

Therefore, in this slot-in type disc drive device, there is proposed a disc drive device in which a plurality of rotary arms are disposed between the disc inserted from the disc insertion/removal slot and the base mounting the turntable on which the disc is mounted to respond to the request of the miniaturization and thinning. And the device performs a loading operation for drawing the disc from the disc insertion/removal slot into the housing while rotating a plurality of rotary arms in a plane parallel to the disc by using an energizing member, such as a coil spring, etc., and an ejection operation for discharging the disc from the disc insertion/removal slot to the exterior of the housing (for example, refer to Patent Document 1: Jpn. Pat. Appln. Laid-Open Publication No. 2002-117604).

In the disc drive device of this type, when the optical disc is discharged, it is required that the central hole of the disc is discharged outward from the disc insertion/removal slot. Further, it is also required that the disc itself does not drop from the disc insertion/removal slot.

Here, when various layers are laminated in a disc manufacturing process, there may be the case that a thickness error occurs with respect to the accuracy of the layer and a disc thinner than conventional thickness of 1.2 mm or a thick laminated disc is used. Further, a recording disc having a thickness of 1.5 mm is provided by laminating a DVD having a thickness of 0.6 mm of a recording layer and a CD having a thickness of 0.9 mm of a recording layer. Then, a disc drive device for recording and/or reproducing a recording disc having a thickness of 1.5 mm in addition to the conventional disc having the thickness of 1.2 mm is desired. Then, even in such a disc drive device, it is necessary to discharge the disc in an optimum discharge amount for each disc irrespective of the differences of the thicknesses and the weights of the corresponding discs.

However, the disc drive device discharges the disc by using only a spring force by an energizing member, such as a coil spring for rotatably energizing a rotary arm. Accordingly, when the thicknesses and the weights of the discs are different, the spring force of the energizing member cannot be controlled. Therefore, it is difficult to provide the optimum discharge amounts in respective discs.

SUMMARY OF THE INVENTION

Therefore, it is desirable to provide a disc drive device which can discharge a disc in an optimum discharge amount in the disc drive device dealing with a disc having different thickness and weight.

To solve the above-mentioned subject, the disc drive device according to the present invention includes a housing having a bottom case and a top cover and formed with a disc insertion/removal slot for inserting or discharging an optical disc; a disc mounting portion for rotatably holding the optical disc inserted into the housing; a disc rotary drive mechanism for rotatably driving the optical disc held in the disc mounting portion; an optical pickup for recording and/or reproducing an information signal to/from the optical disc rotatably driven by the disc rotary drive mechanism; a pickup moving mechanism for moving the optical pickup in a radial direction of the optical disc; and a disc conveying mechanism formed with a supporting portion to support the outer peripheral surface of the optical disc, and having a plurality of arms rotatably supported in the housing, and an energizing member for rotatably energizing the plurality of the rotary arms in a predetermined direction, and conveying the optical disc between a disc mounting position for holding the optical disc inserted into the housing in the disc holding portion and a disc insertion/removal position for inserting/removing the optical disc, the top cover having a control portion for controlling a rotary region of the plurality of rotary arms which energizes the optical disc in the discharging direction by contacting with the plurality of the rotary arms supporting the outer peripheral surface of the optical disc.

According to the above disc drive device, when a plurality of rotary arms are rotated in a direction for discharging the optical disc when the optical disc is pressed to the disc insertion/removal position by a plurality of rotary arms, the rotary arms are brought into contact with the control portion provided at the top cover. Therefore, the energizing force of the energizing member for rotating the plurality of rotary arms is suppressed. Even when an optical disc having different thickness and weight is used, it is possible to prevent the optical disc from being ejected, and set an optimum discharging amount.

DETAILED DESCRIPTION OF THE PREFERRED EMBODIMENTS

Figure 1:
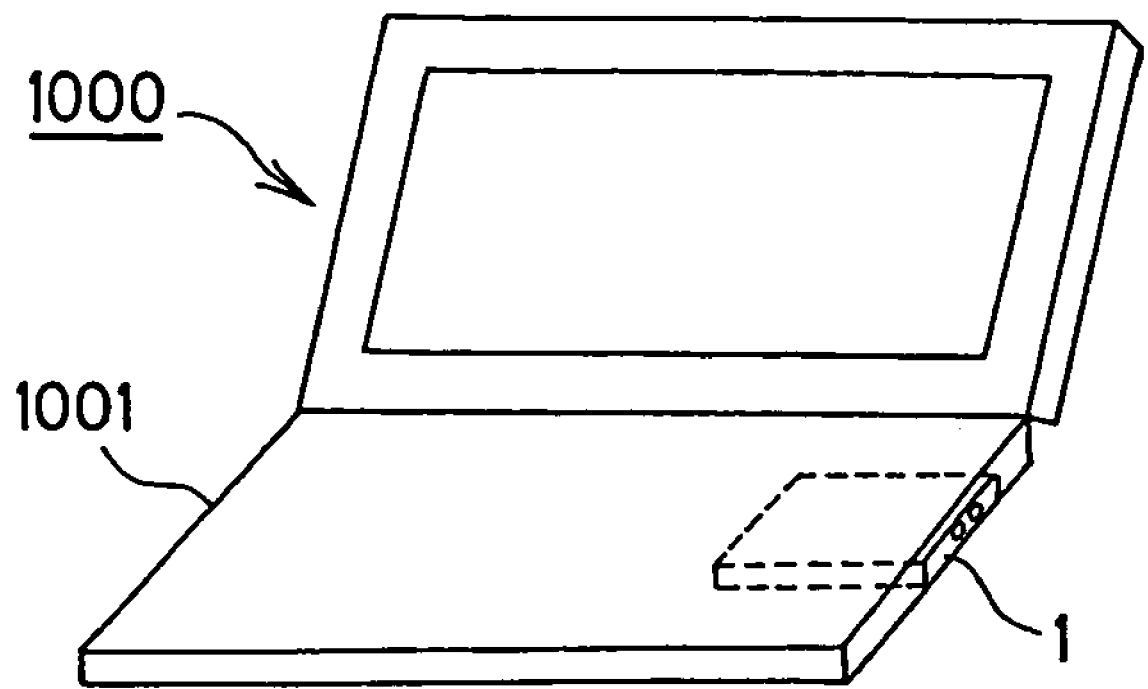
FIG. 1 is a perspective view showing an appearance of a notebook-sized personal computer carrying a disc drive device.
Figure 2:
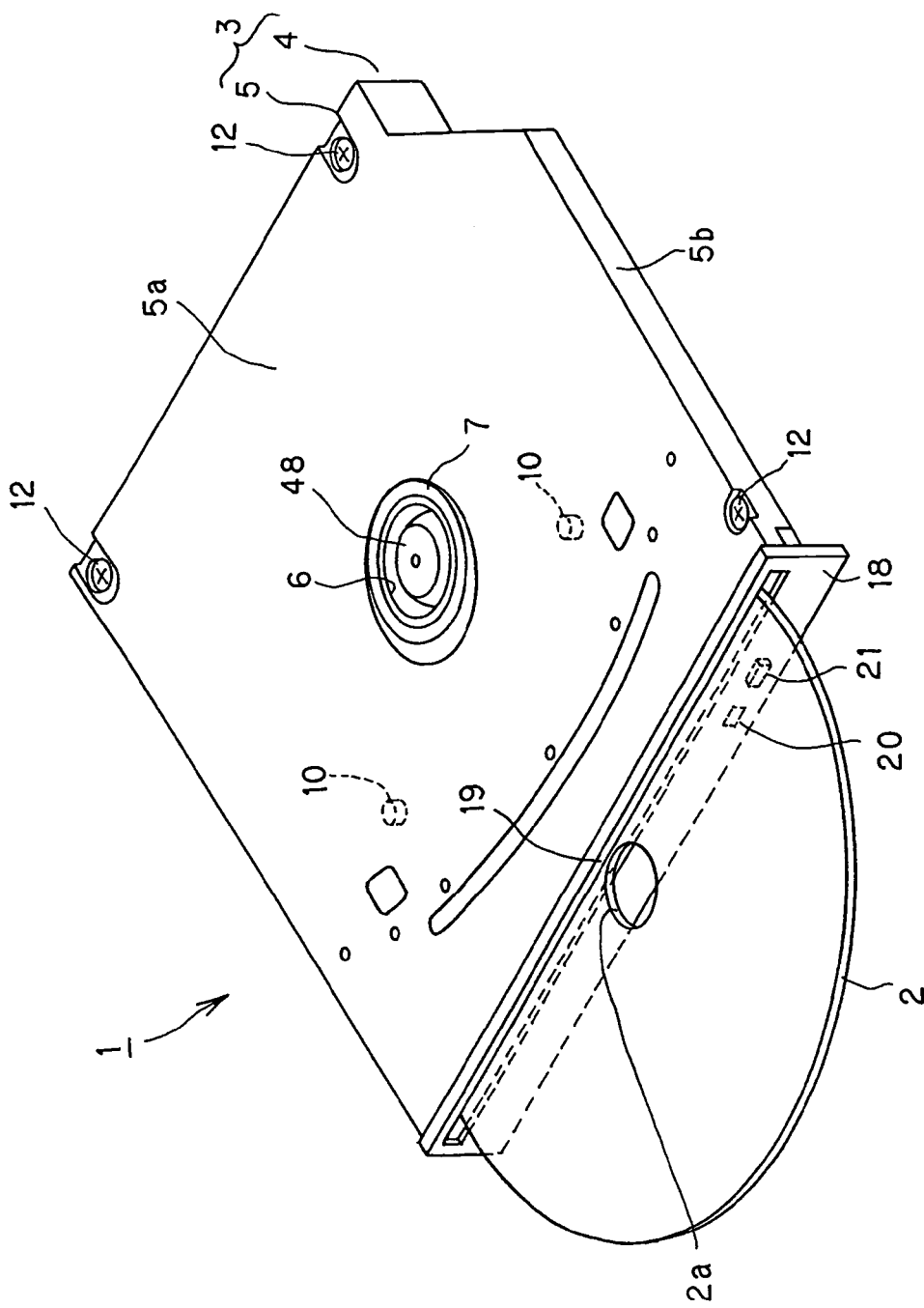
FIG. 2 is an appearance perspective view showing the disc drive device in which an optical disc is discharged to an optimum discharging position.

The disc drive device to which the present invention is applied, will be described in detail with reference to the accompanying drawings. The disc drive device to which the present invention is applied, is, as shown, for example, in FIG. 1, a slot-in type disc drive device 1 carried in the device body 1001 of a laptop personal computer 1000. This disc drive device 1 has, as shown in FIG. 2, a structure that the entire device is reduced in thickness, for example, up to about 12.7 mm. The disc drive device 1 can record/reproduce an information signal to/from an optical disc 2, such as a CD (Compact Disc) or a DVD (Digital Versatile Disc).

This disc drive device 1 has, as shown in FIG. 2, a housing 3 as an outer casing of a device body. The housing 3 has a bottom case 4 of a substantially flat box shape of a lower housing, and a top cover 5 of a top plate covering the upper opening of the bottom case 4.

Figure 3:
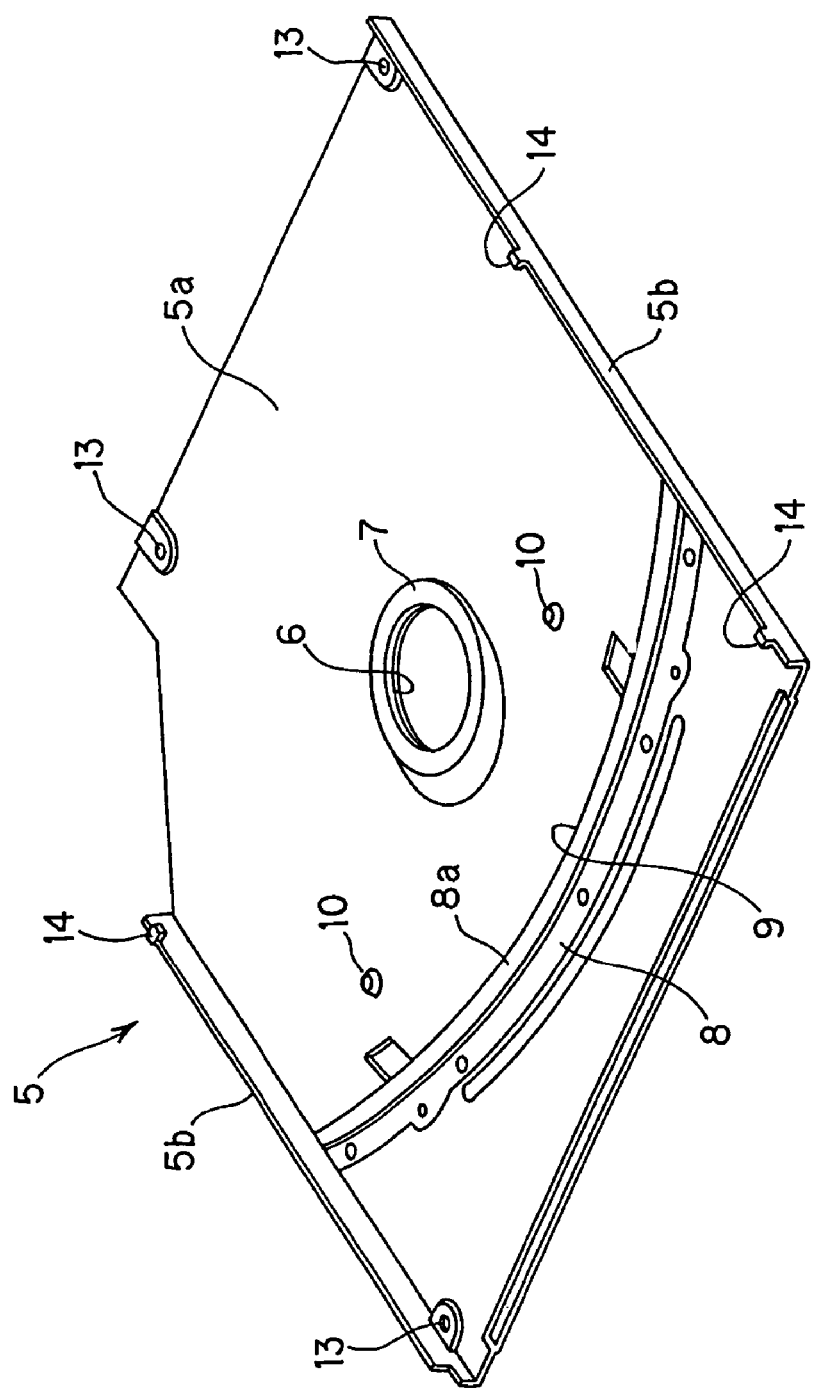
FIG. 3 is a perspective view as seen from an inner surface side of a top cover.

The top cover 5 is made of, as shown in FIG. 2 and FIG. 3, a thin steel plate. The top cover 5 has a top plate portion 5a for closing the upper opening of the bottom case 4, and a pair of side plate portions 5b slightly bent along both the side faces of the bottom case 4 at the periphery of this top plate portion 5a. The substantially central portion of the top plate portion 5a is formed with a substantially circular shape opening 6. The opening 6 allows the engaging protrusion 48a of a turntable 47 to be engaged with the central hole 2a of the optical disc 2 to face the outside at a chucking operation time to be described later. Moreover, a chucking plate 7 chucks by contacting with the periphery of the central hole 2a of the optical disc 2 placed on the turntable 47. The chucking plate 7 is formed to slightly protrude toward the inside of the housing 3 on the periphery of the opening 6 of the top plate portion 5a.

A guide member 8 for guiding the tip end of a first rotary arm 61 and the tip end of a second rotary arm 62 to be described later in a direction for approaching or separating each other on the main surface of the inside of the top plate portion 5a while controlling the tip end of the first rotary arm 61 and the tip end of the second rotary arm 62 in the height direction. The guide member 8 is made of a steel plate formed in a substantially circular arc shape over between both the side plate portions 5b of the top plate portion 5a. The guide member 8 is mounted at the front surface side of the top plate portion 5a by spot welding, etc. Further, the guide member 8 has a step portion 8a in which a back surface side is one step higher than the mounting surface of the front surface side. In this manner, a guide groove 9 engaged with the tip end of the first rotary arm 61 and the tip end of the second rotary arm 62 is formed between the step portion 8a of the back surface side of the guide member 8 and the top plate portion 5a. A window portion for working for engaging the tip end of the first rotary arm 61 and the tip end of the second rotary arm 62 with this guide groove 9 is provided at the top plate portion 5a.

Furthermore, a pair of control projecting portions 10 for controlling the energizing forces of these first and second rotary arms by contacting the first rotary arm 61 and the second rotary arm 62 for discharging the disc 2 are projected from the top plate portion 5a. The control projecting portions 10 are provided on the rotary regions of the first and second rotary arms 61 and 62. The control projecting portions 10 are contacted with the first and second rotary arms 61 and 62 rotatably energized to the vicinity of a disc insertion/removal slot 19. Thus, the control projecting portions 10 control the rotations of the first and second rotary arms 61 and 62 for pushing out the optical disc 2 out of the housing 3. Thus, the amount of discharge of the optical disc 2 can be optimized.

This control protruding portions 10 are formed integrally with the top cover 5. However, the control protruding portions 10 are formed separately from the top cover 5, and may be adhered to predetermined positions of the top plate portion 5a.

Incidentally, the control protruding portions 10 may optimize the amount of discharge of the optical disc 2 by slidably contacting with the first rotary arm 61 and the second rotary arm 62 rotatably energized in a direction for discharging the optical disc 2. That is, the control protruding portions 10 can optimize the amount of discharge of the optical disc 2 by slidably contacting with the upper surfaces of the first and second rotary arms 61 and 62 to suppress the energizing force of a twist coil spring 70 for energizing these first and second rotary arms 61 and 62 in the discharging direction of the optical disc 2.

Figure 4:
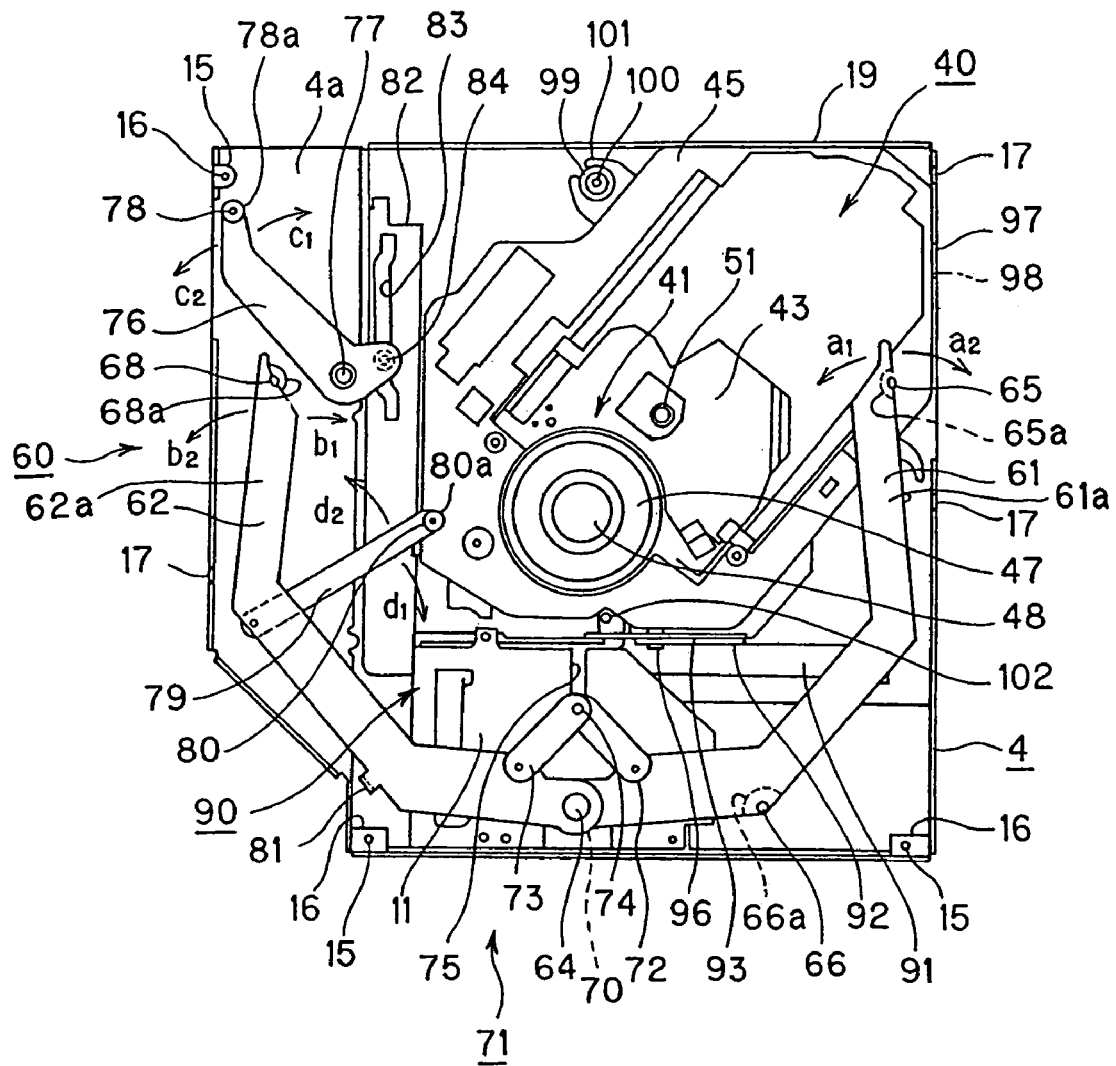
FIG. 4 is a plan view showing a configuration of the disc drive device.

As shown in FIG. 4, the bottom case 4 is made of a steel plate formed in a substantially flat box shape. The bottom surface portion of the bottom case 4 is a substantially rectangular shape. A deck portion 4a raised from the bottom surface portion and extended to the outside is provided at one side face portion. Furthermore, a circuit substrate is attached by screw clamping, etc., to the bottom surface portion of the bottom case 4. Though not shown, an electronic part, such as an IC chip for constituting a drive control circuit, a connector for electrically connecting respective portions, a detecting switch for detecting an operation of each portion, etc., are disposed on the circuit substrate. Also, a chassis 11 is mounted by screw clamping at the bottom surface portion of the bottom case 4. The chassis 11 is disposed above the circuit substrate so as to vertically partition the inside of the bottom case 4 in height substantially the same as the deck portion 4a.

As shown in FIG. 2, the top cover 5 is attached by screw clamping at the bottom case 4. More particularly, as shown in FIG. 3, a plurality of through holes 13 for passing screws 12 are formed at the outer peripheral portion of the top plate portion 5a. A plurality of guide pieces 14 each bent substantially right angle toward inside is formed at the side plate portions 5b on both sides. On the other hand, as shown in FIG. 4, a plurality of fixing pieces 15 each bent substantially right angle to the inside are provided at the outer peripheral portion of the bottom case 4. Screw holes 16 corresponding to the through holes 13 of the top cover 5 are formed at these fixing pieces 15. Also, a plurality of guide slits 17 for retaining a plurality of guide pieces 14 of the top cover 5 are formed at both the side face portions of the bottom case 4.

When the top cover 5 is attached to the bottom case 4, the top cover 5 is slid from the front surface side to the back surface side in the state that the plurality of the guide pieces 14 are engaged with the plurality of the guide slits 17 of the bottom case 4. Thus, it becomes the state that the top plate portion 5a of the top cover 5 closes the upper opening of the bottom case 4. Then, in this state, the screws 12 are engaged with the screw holes 16 of the bottom case 4 through the plurality of through holes 13 of the top cover 5. As described above, the housing 3 shown in FIG. 2 is constituted.

Incidentally, after assembling, a label seal (not shown) covering the above-mentioned opening 6 or the window for working is adhered to the top plate portion 5a of the top cover 5. Thus, it prevents dusts, etc., from invading into the housing 3.

As shown in FIG. 2, a front panel 18 of substantially rectangular flat plate shape is mounted on the front surface of the housing 3. The disc insertion/removal slot 19 for inserting/removing the optical disc 2 in a horizontal direction is provided on the front panel 18. That is, the optical disc 2 can be inserted from the disc insertion/removal slot 19 into the housing 3 or can be discharged from the disc insertion/removal slot 19 to out of the housing 3. Moreover, a display unit 20 for lightening and displaying an accessing state to the optical disc 2 and an ejection button 21 to be pressed when the optical disc 2 is discharged, are provided on the front surface of the front panel 18. A plurality of locking pieces for mounting the front panel 18 on the front surface of the housing 3 are provided on the back surface side of the front panel 18. To prevent dust from invading from the disc insertion/removal slot 19 into the housing 3, the front panel 18 is provided with a panel curtain 23 made of an artificial leather suede, etc., covering this disc insertion/removal slot 19.

Then, a base unit 40 for chucking and rotatably driving the optical disc 2 and recording/reproducing an information signal will be described.

Figure 5:
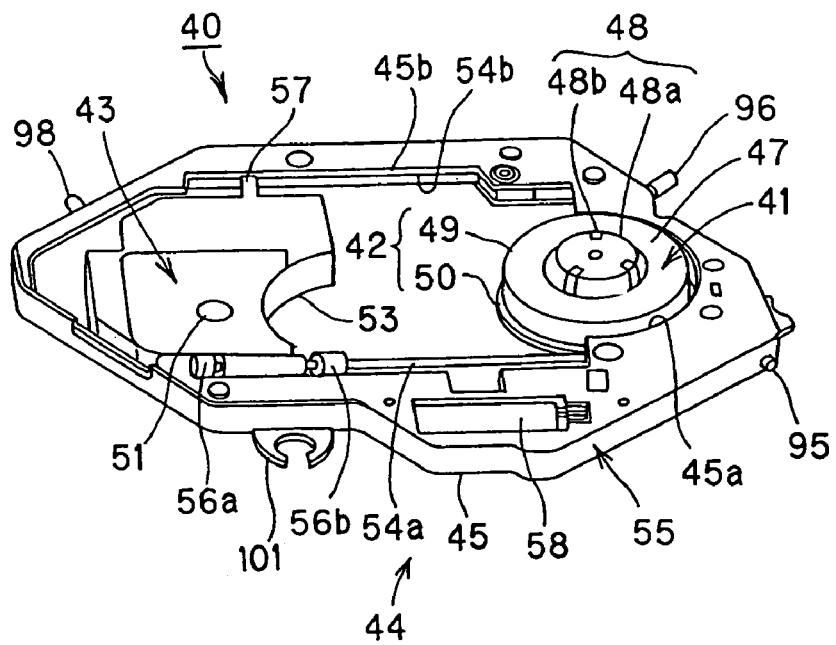
FIG. 5 is a perspective view showing the configuration of a base unit.

As shown in FIG. 5, the base unit 40 is provided at the bottom surface portion of the bottom case 4. The base unit 40 includes a disc mounting portion 41 in which the optical disc 2 inserted into the housing 3 from the disc insertion/removal slot 19 is mounted, a disc rotatably driving mechanism 42 for rotatably driving the optical disc 2 mounted in the disc mounting portion 41, an optical pickup 43 for writing or reading a signal on or from the optical disc 2 rotatably driven by this disc rotatably driving mechanism 42, and a pickup feeding mechanism 44 for operating to feed the optical pickup 43 in the radial direction of the optical disc 2, and has an extra-thin structure provided integrally with a base 45.

The base unit 40 is disposed on the front surface side from the chassis 11 so that the disc mounting portion 41 is disposed at a substantially center on the bottom surface portion of the bottom case 4. Further, the base unit 40 is vertically movable by a base elevation mechanism 90 to be described later. The base unit 40 is disposed lower than the optical disc 2 to be inserted into the housing 3 from the disc insertion/removal slot 19 in the initial state before the optical disc 2 is inserted. When the optical disc 2 is inserted, the base unit 40 is raised by the base elevation mechanism 90. Then, the optical disc 2 is mounted in the disc mounting portion 41, and rotatably driven. Thus, the optical pickup 43 records and/or reproduces the information signal. When the optical disc 2 is discharged, the base unit 40 is moved down by the base elevation mechanism 90. Thereby, the optical disc 2 is removed from the disc mounting portion 41. Then, the optical disc 2 can be conveyed by a disc conveying mechanism 60 to be described later.

A base 45 is formed by punching a steel plate in a predetermined shape, and then bending it down slightly at its periphery. An opening 45a for a substantially semi-circular table that allows turntable 47 of the disc mounting portion 41 to be described later to face upward, and an opening 45b for a substantially rectangular pickup that allows an objective lens 51 of the optical pickup 43 to be described later to face upward are formed continuously on the main surface of the base 45. A decorative laminate (not shown) having openings formed corresponding to these openings 45a and 45b is mounted on the upper surface of the base 45.

The disc mounting portion 41 has the turntable 47 rotatably driven by the disc rotatably driving mechanism 42. A chucking mechanism 48 for mounting the optical disc 2 is provided at the center of this turntable 47. The chucking mechanism 48 has an engaging projecting portion 48a engaged with the central hole 2a of the optical disc 2, and a plurality of locking pawls 48b for locking the periphery of the central hole 2a of the optical disc 2 engaged with the engaging projecting portion 48a. The optical disc 2 is held on the turntable 47.

The disc rotatably driving mechanism 42 has a flat spindle motor 49 for rotatably driving the optical disc 2 integrally with the turntable 47. The spindle motor 49 is attached by screw clamping at the lower surface of the base 45 through a supporting plate 50 so that the turntable 47 provided on the upper surface portion slightly projects from the opening 45a for the table of the base 45.

The optical pickup 43 converges an optical beam emitted from a semiconductor laser becoming a light source by the objective lens 51. Then, the optical pickup 43 radiates the optical beam to the signal recording surface of the optical disc 2. The optical pickup 43 has an optical block for detecting the return optical beam reflected on the signal recording surface of the optical disc 2 by a photodetector made of a light receiving element, etc. The optical pickup 43 writes or reads the signal on/from the optical disc 2.

This optical pickup 43 has an objective lens driving mechanism, such as a biaxial actuator, etc. for driving to displace the objective lens 51 in an optical axis direction (called a focusing direction) and a direction (called a tracking direction) perpendicular to the recoding track of the optical disc. The optical pickup 43 controls driving of a focus servo for focusing the objective lens 51 on the signal recording surface of the optical disc 2, and a tracking servo for allowing the recording track to follow the spot of the optical beam converged by the objective lens 51, while the biaxial actuator displaces the objective lens 51 in the focusing direction or tracking direction based on the detection signal from the optical disc 2 detected by the above described photodetector. As the objective lens driving mechanism, a triaxial actuator may be used. The triaxial actutor can regulate the inclination (skew) of the objective lens 51 to the signal recording surface of the optical disc 2 so as to radiate the optical beam converged by the objective lens 51 perpendicularly to the signal recording surface of the optical disc 2, in addition to such focusing control and tracking control.

The pickup feeding mechanism 44 has a pickup base 53, a pair of guide shafts 54a and 54b, and a displacement drive mechanism 55. The pickup base 53 is mounted with the optical pickup 43. The pair of the guide shafts 54a and 54b slidably support the pickup base 53 in the radial direction of the optical disc 2. The displacement drive mechanism 55 drives to displace the pickup base 53 supported by these pair of the guide shafts 54a and 54b in the radial direction of the optical disc 2.

In the pickup base 53, a pair of guide pieces 56a and 56b having guide holes formed to insert the one guide shaft 54a of the pair of the guide shafts 54a and 54b and a guide piece 57 having a guide groove formed to sandwich the other guide shaft 54b are formed to project from the opposed side faces. Thus, the pickup base 53 is supported slidably to the pair of the guide shafts 54a and 54b.

The pair of the guide shafts 54a and 54b are disposed to be parallel to the radial direction of the optical disc 2 on the lower surface of the base 45. The pickup base 53 which the optical pickup 43 faces from the opening 45b for pickup of the base 45 is guided over the inner and outer peripheries of the optical disc 2.

The displacement drive mechanism 55 converts the rotary drive of a driving motor 58 mounted on the base 45 into a linear drive through a gear and a rack (not shown). Then, the displacement drive mechanism 55 drives the pickup base 54 in a direction along the pair of guide shafts 54a and 54b, that is, in the radial direction of the optical disc 2.

As shown in FIG. 4, the disc drive device 1 has a disc conveying mechanism 60 for conveying the optical disc 2 between the disc insertion/removal position and the disc mounting position. At the disc insertion/removal position, the optical disc 2 is inserted to and removed from the disc insertion/removal slot 19. At the disc mounting position, the optical disc 2 is mounted on the turntable 47 of the disc mounting portion 41. The disc conveying mechanism 60 has a first rotary arm 61 and a second rotary arm 62 as support members. The support member is operated to move between the main surface of the top plate 5a opposed to the disc mounting portion 41 and the main surface of the optical disc 2 inserted from the disc insertion/removal slot 19. The first rotary arm 61 and the second rotary arm 62 are rockable in a plane parallel to the main surface of the optical disc 2.

These first rotary arm 61 and the second rotary arm 62 are disposed at both left and right sides of the disc mounting portion 41. The base ends disposed at the back surface side from the disc mounting portion 41 are supported rotatably. Further, the tip ends disposed at the front surface side from the disc mounting portion 41 are rockable in the direction approaching or separating with each other in a plane parallel to the main surface of the optical disc 2 inserted from the disc insertion/removal slot 19.

More particularly, the first rotary arm 61 is made of a long steel plate. The first rotary arm 61 is positioned at one side (for example, at right side in FIG. 4) of left and right sides of the turntable 47 of the disc mounting portion 41. The base end is supported rotatably in a direction of an arrow $a_1$ and an arrow $a_2$ in FIG. 4 through a first supporting shaft 64 provided on the chassis 11. Further, a first front surface side contact member 65 is projected downward at the tip end of the first rotary arm 61. The first front surface side contact member 65 is contacted with the outer periphery of the optical disc 2 inserted from the disc insertion/removal slot 19. In addition, a first back surface side contact member 66 contacted with the outer periphery of the optical disc 2 together with the first front surface side contact member 65 is provided to be projected downward near the base end of the first rotary arm 61 when the optical disc 2 is positioned at the disc mounting position.

The first front surface side contact member 65 and the first back surface side contact member 66 are made of softer resin than the optical disc 2. The central portion contacted with the outer periphery of the optical disc 2 inserted from the disc insertion/removal slot 19 is curved to the inside. The both end portions of the central portion each has a substantially circular shape for controlling the movement in the height direction of the optical disc 2 as flange portions 65a and 65b radially enlarged at its both ends. Further, these first front surface side contact member 65 and the first back surface side contact member 66 may be each a small diameter rotary roller mounted rotatably on the main surface of the first rotary arm 61 opposed to the disc mounting portion 41.

On the other hand, the second rotary arm 62 is made of a long steel plate. The second rotary arm 62 is positioned at the other side (for example, at left side in FIG. 4) of both the left and right sides of the turntable 47 of the disc mounting portion 41. The base end portion is supported rotatably in a direction of an arrow $b_1$ and a direction of an arrow $b_2$ in FIG. 4 through the first supporting shaft 64 provided on the chassis 11. Further, a second front surface side contact member 68 contacted with the outer periphery of the optical disc 2 inserted from the disc insertion/removal slot 19 is projected downward and provided at the tip end of the second rotary arm 62.

The second front surface side contact member 68 is made of a resin softer than the optical disc 2. The central portion contacted with the outer periphery of the optical disc 2 inserted from the disc insertion/removal slot 19 is curved to the inside. Its both ends each has a substantially circular shape for controlling the movement of the optical disc 2 in the height direction as a flange portion 68a radially enlarged at its both end portions. Further, the second front surface side contact member 68 may be a small diameter rotary roller mounted rotatably on the main surface of the second rotary arm 62 opposed to the disc mounting portion 41.

Moreover, a twist coil spring 70 of an energizing means for energizing these rotary arms 61 and 62 in a direction approaching to each other is provided at the base ends of the first rotary arm 61 and the second rotary arm 62. The twist coil spring 70 is locked at one end to the base end of the first rotary arm 61 in the state that the first supporting shaft 64 is inserted into its winding portion, and locked at the other end to the base end of the second rotary arm 62 to energize the first and second rotary arms 61 and 62 in the direction approaching to each other. The twist coil spring 70 has an energizing force sufficient to draw plural types of optical discs 2 having different thicknesses and weights into the housing 3 and to discharge the optical disc 2 out of the housing 3 by rotating the first and second rotary arms 61 and 62.

Thus, the first rotary arm 61 and the second rotary arm 62 are disposed at positions substantially symmetrical with each other, interposing the turntable 47 of the disc mounting portion 41. The rotating centers of the first rotary arm 61 and the second rotary arm 62 coincide at the substantially central portion at the back surface side from the disc mounting portion 47. Further, the tip end of the first rotary arm 61 and the tip end of the second rotary arm 62 are supported slidably along the rotating direction in the state that the tip end of the first rotary arm 61 and the tip end of the second rotary arm 62 are engaged with the guide groove 9 of the above-mentioned top plate portion 5a.

When these first and second rotary arms 61 and 62 are rotated in a direction of an arrow $a_1$ and direction of an arrow $b_1$ in FIG. 4 for discharging the optical disc 2, the upper surfaces of the arm bodies 61a and 62a of the first and second rotary arms 61 and 62 are contacted with the control projecting portions 10 projecting to the top plate portion 5a of the top cover 5. Thus, the energizing force of the twist coil spring 70 for rotating the first and second rotary arms 61 and 62 in the direction of the arrow $a_1$ and the direction of the arrow $b_1$ in FIG. 4 is suppressed. Even when various type of optical discs 2 having different thicknesses and weights are used, it prevents the optical disc 2 from being projected, and the optimum amount of discharge can be performed.

The disc conveying mechanism 60 has an interlocking mechanism 71 for interlocking the first rotary arm 61 and the second rotary arm 62. The first rotary arm 61 and the second rotary arm 62 are rotatable in a reverse direction through the interlocking mechanism 71. More particularly, the interlocking mechanism 71 has a first coupling arm 72 and a second coupling arm 73 for coupling the first rotary arm 61 and the second rotary arm 62. These first coupling arm 72 and the second coupling arm 73 are each made of a long steel plate. The one ends of the first coupling arm 72 and the second coupling arm 73 in the longitudinal direction are supported rotatably to the base end of the first rotary arm 61 and the base end of the second rotary arm 62. The other ends of the first and second rotary arms 61 and 62 in the longitudinal direction are supported rotatably through a second supporting shaft 74. Thus, it has so-called a pantograph structure. Further, the second supporting shaft 74 is engaged with a guide slit 75 provided at the front surface side from the first supporting shaft 64 of the chassis 11. The guide slit 75 is formed linearly over the inserting direction of the optical disc 2.

Therefore, the first rotary arm 61 and the second rotary arm 62 are rotatable in a reverse direction to each other through the first coupling arm 72 and the second coupling arm 73 when the second supporting shaft 74 slides in the guide slit 75. That is, the tip end of the first rotary arm 61 and the tip end of the second rotary arm 62 are rockable in a direction approaching to or separating from each other by the interlocking mechanism 71.

Further, the disc conveying mechanism 60 has a third rotary arm 76 rockable in a plane parallel to the main surface of the optical disc 2 inserted from the disc insertion/removal slot 19 as a loading auxiliary means for auxiliary performing the loading operation for drawing the optical disc 2 from the disc insertion/removal slot 19 into the housing 3. The third rotary arm 76 is made of a long steel plate. The third rotary arm 76 is positioned at the front surface side from the second rotary arm 62 at one side (for example, at left side in FIG. 4) of left and right sides of the turntable 47 of the disc mounting portion 41. The third rotary arm 76 is supported rotatably in a direction of an arrow $c_1$ and a direction of an arrow $c_2$ through a supporting shaft 77 provided on the deck portion 4a. Further, a third contact member 78 contacted with the outer periphery of the optical disc 2 inserted from the disc insertion/removal slot 19 is projected upward and provided at the tip end of the third rotary arm 76.

The third contact member 78 is a small diameter rotary roller mounted rotatably on the main surface of the third rotary arm 76 opposed to the top plate portion 5a. The third contact member 78 is made of a resin softer than the optical disc 2. Further, the third contact member 78 is curved to the inside at the central portion contacted with the outer periphery of the optical disc 2 inserted from the disc insertion/removal slot 19. The third contact member 78 has a substantially circular shape for controlling the movement of the optical disc 2 in the height direction as a flange portion 78a radially enlarged at both end portions.

The third rotary arm 76 is locked by a twist coil spring (not shown). Thus, the third rotary arm 76 is energized to be able to be switched in the direction that the third contact member 78 is contacted with the outer periphery of the optical disc 2 and the direction that the third contact member 78 is separated from the outer periphery of the optical disc 2.

Furthermore, the disc conveying mechanism 60 has a fourth rotary arm 79 rockable in a plane parallel to the main surface of the optical disc 2 inserted from the disc insertion/removal slot 19, as an ejection auxiliary means for auxiliary performing the ejection operation of the optical disc 2 from the disc insertion/removal slot 19 to the outside of the housing 3. The fourth rotary arm 79 is made of a long steel plate. The fourth rotary arm 79 is supported rotatably in a direction of an arrow $d_1$ and a direction of an arrow $d_2$ at the intermediate portion of the second rotary arm 62 at one side (for example, at left side in FIG. 4) of left and right sides of the turntable 47 of the disc mounting portion 41. Further, a fourth contact member 80 contacted with the back surface side of the outer periphery of the optical disc 2 inserted from the disc insertion/removal slot 19 is projected upward at the tip end of the fourth rotary arm 79.

The fourth contact member 80 is made of a resin softer than the optical disc 2. The central portion contacted with the outer periphery of the optical disc 2 inserted from the disc insertion/ removal slot 19 is curved to the inside. The fourth contact member 80 has a substantially circular shape for controlling the movement of the optical disc 2 in the height direction as a flange portion 80a radially enlarged at both the end portions. Further, the fourth contact member 80 may be a small diameter rotary roller mounted rotatably on the main surface of the fourth rotary arm 79 opposed to the top plate portion 5a.

Furthermore, the second rotary arm 62 has a control piece 81 for controlling the rotation of the fourth rotary arm 79 to the back surface side when the fourth rotary arm 79 is rotated to the back surface side, that is, in a direction of an arrow $d_1$.

The disc conveying mechanism 60 has a driving lever 82 for allowing the above-mentioned respective rotary arms 61, 62, 76 and 79 to be in cooperation with each other. The driving lever 82 is made of a resin member entirely formed in a substantially rectangular parallelepiped shape. The driving lever 82 is disposed at the bottom portion of the bottom case 4 between the one side face portion of the bottom case 4 and the base unit 40. Further, the driving lever 82 is disposed lower than the optical disc 2 inserted from the disc insertion/removal slot 19 into the housing 3, and its upper surface portion has a height substantially coincident with the bottom portion of the deck portion 4a. The driving lever 82 is driven slidably in a longitudinal direction through a displacement drive mechanism (not shown) made of a driving motor, a gear group, etc., provided at the bottom portion of the bottom case 4.

In the disc conveying mechanism 60, the above-mentioned second supporting shaft 74 slides in the guide slit 75 in cooperation with the sliding operation of this driving lever 82. Thus, the first rotary arm 61 and the second rotary arm 62 are operated to be rotated reversely through the interlocking mechanism 71. A guide pin 84 to be engaged with the guide slit 83 provided on the upper surface of the driving lever 82 is provided at the base end side of the third rotary arm 76. Thus, the third rotary arm 76 is operated to be rotated when the guide pin 84 slides in the guide slit 83 in cooperation with the sliding operation of the driving lever 82. Further, the fourth rotary arm 79 is also operated to be rotated in cooperation with the sliding operation of the driving lever 82 through a coupling mechanism (not shown).

Then, in the disc conveying mechanism 60, a loading operation for drawing the optical disc 2 from the disc insertion/removal slot into the housing 3, a centering operation for positioning the optical disc 2 at the disc mounting position, and an ejection operation for discharging the optical disc 2 from the disc insertion/removal slot 19 to the outside of the housing 3 are performed, while the first rotary arm 61, the second rotary arm 62, the third rotary arm 76 and the fourth rotary arm 79 cooperate with each other.

As shown in FIG. 4, the disc drive device 1 has a base elevation mechanism 90 for operating to elevate the base 45 for supporting the optical pickup 43 in cooperation with the sliding of the above-mentioned driving lever 82.

The base elevation mechanism 90 operates to move up and down the base 45 between the chucking position for mounting the optical disc 2 positioned at the disc mounting position on the turntable 47 of the disc mounting portion 41 by raising the base 45, the chucking releasing position for releasing the optical disc 2 from the turntable 47 of the disc mounting portion 41 by lowering the base 45, and the intermediate position for recording or reproducing a signal on or from optical disc 2 by positioning the base 45 between the chucking position and the chucking releasing position.

More particularly, cam slits (not shown) corresponding to the chucking position, the chucking releasing position and the intermediate position are formed over the longitudinal direction on the side face of the above-mentioned driving lever 82 opposed to the base 45.

Further, a cam lever 91 is disposed along the side face of the back surface side of the base 45 at the bottom portion of the bottom case 4. The cam lever 91 is made of a long flat plate member. The cam lever 91 is operated to be slid in a direction substantially perpendicular to the sliding direction of the driving lever 82 in cooperation with the sliding of the driving lever 82 in the longitudinal direction. Further, a cam piece 92 bent upward from the edge opposed to the base 45 is provided at the intermediate portion of the cam lever 91. The cam slits (not shown) corresponding to the chucking position, the chucking releasing position and the intermediate position are formed over the longitudinal direction at the cam piece 92.

Further, a bent piece 93 is formed along the side face of the back surface side of the base 45 at the bottom portion of the bottom case 4. A vertical slit (not shown) for raising and lowering the base 45 is formed over a vertical direction at the bent piece 93.

On the contrary, as shown in FIG. 5, the base 45 has a first supporting shaft 95, a second supporting shaft 96, a third supporting shaft 98 and a fixed supporting portion 101. The first supporting shaft 95 is disposed at the disc mounting portion 41 side opposed to the driving lever 82 and supported to be engaged with the cam slit of the driving lever 82. The second supporting shaft 96 is disposed at the disc mounting portion 41 of the side face opposed to the cam lever 91 and supported to be engaged with the cam slit of the cam pieces 92 and the vertical slit of the bent piece 93. The third supporting shaft 98 is disposed at the front surface side of the side face at the opposite side to the side face opposed to the driving lever 82 and supported rotatably to the axial hole 97 provided at the side face on the other side of the bottom case 4. The fixed supporting portion 101 is disposed at the front surface side of the side face at the opposite side to the cam lever 91 and fixedly supported by a screw 100 to the bottom portion of the bottom case 4 through the insulator 99 made of a viscoelastic member, such as rubber.

Therefore, in this base elevation mechanism 90, the first supporting shaft 95 slides in the cam slit of the driving lever 82 in cooperation with the sliding of the driving lever 82 and the cam lever 91. The second supporting shaft 96 slides in the cam slit of the cam lever 91 and the vertical slit of the bent piece 93. Thus, the disc mounting portion 41 side of the base 45 operates to vertically move up and down to the front surface side between the chucking position, the chucking releasing position and the intermediate position.

As shown in FIG. 4, a lifting pin 102 of a chucking releasing means for separating the optical disc 2 mounted on the turntable 47 of the disc mounting portion 41 from the turntable 47 when the base elevation mechanism 90 moves down the base 45 is provided at the bottom portion of the bottom case 4. The lifting pin 102 is disposed on the back surface side of the base 45 approached near the disc mounting potion 41 of the base unit 40, or more particularly, nearest to the disc mounting portion 41, and projected upward from the bottom portion of the bottom case 41.

Figure 6:
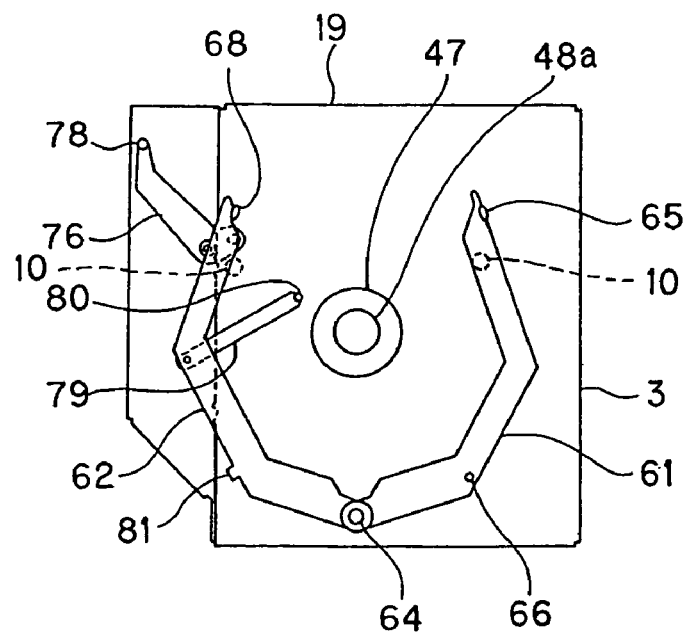
FIG. 6 is a plan view for explaining the operation of the disc drive device and showing an initial state thereof.

Then, the concrete operation of the disc drive device 1 constituted as described above will be described. As shown in FIG. 6, in the disc drive device 1, in the initial state before the optical disc 2 is inserted, the first rotary arm 61 and the second rotary arm 62 are held in the state that the tip ends of the respective first rotary arm 61 and the second rotary arm 62 are opened at a predetermined spread angle. Also, the third rotary arm 76 is held in the state that the tip end of the third rotary arm 76 is disposed outside from the base end and the tip end is disposed at the front surface side from the base end. Further, the fourth rotary arm 79 is held in the state that the tip end is disposed inside from the base end and the tip end is disposed at the front surface side from the base end. Also, the driving lever 82 is disposed at the front surface side of the bottom case 4.

At this time, the first rotary arm 61 and the second rotary arm 62 are controlled in the rotation to the direction approaching at the tip ends to each other by contacting with the control projecting portions 10 provided at the top cover 5.

Figure 7:
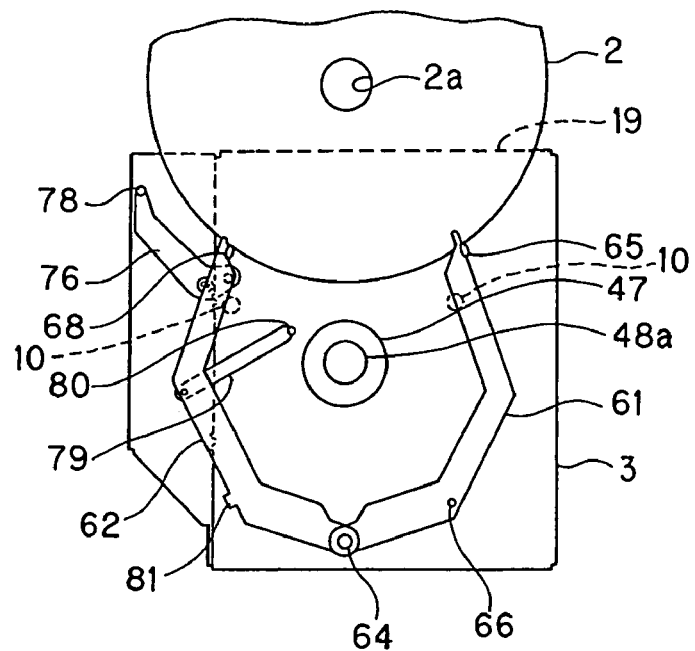
FIG. 7 is a plan view for explaining the operation of the disc drive device and showing the insertion starting state of the optical disc.

When the optical disc 2 is inserted from the disc insertion/removal slot 19 of the housing 3, the disc drive device 1 performs the loading operation for drawing the optical disc 2 up to the disc mounting position. More particularly, when the optical disc 2 is inserted from the disc insertion/removal slot 19 of the housing 3, first, as shown in FIG. 7, it becomes the state that the back surface side of the outer periphery of the optical disc 2 inserted from the disc insertion/removal slot 19 into the housing 3 is contacted with the first front surface side contact member 65 of the first rotary arm 61 and the second front surface side contact member 68 of the second rotary arm 62.

Figure 8:
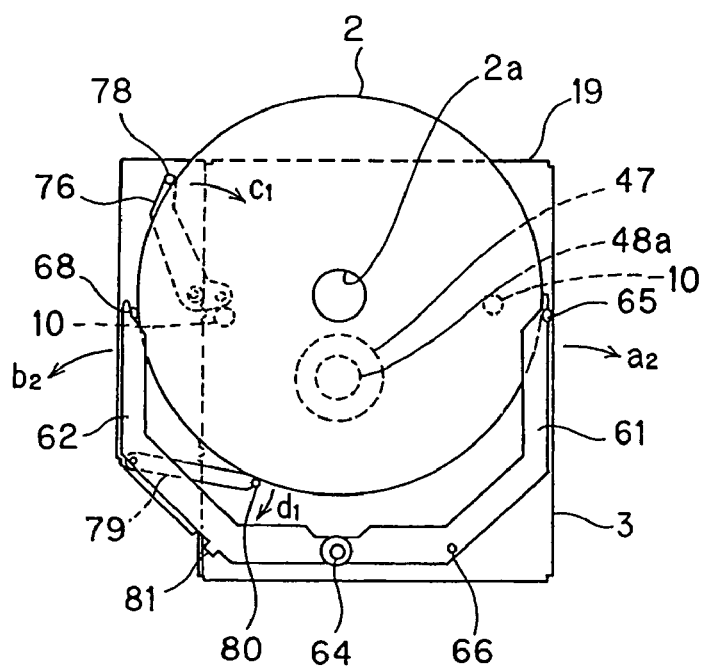
FIG. 8 is a plan view for explaining the operation of the disc drive device and showing the drawing starting state of the optical disc.

As shown in FIG. 8, when the optical disc 2 is pushed from the disc insertion/removal slot 19 into the housing 3 from this state, the first rotary arm 61 and the second rotary arm 62 sandwich the outer periphery of the optical disc 2 between the first front surface side contact member 65 and the second front surface side contact member 68. At this time, in the state that the first front surface side contact member 65 and the second front surface side contact member 68 are contacted with the back surface side of the outer periphery of the optical disc 2, the first rotary arm 61 and the second rotary arm 62 are rotated in the direction separating from each other against the energizing force of the twist coil spring 70, that is, in directions of arrows $a_2$, $b_2$ shown in FIG. 8.

When the first rotary arm 61 and the second rotary arm 62 are rotated by a predetermined amount in the direction separating from each other, the sliding of the driving lever 82 to the back surface side by the displacement drive mechanism is started due to the pressing of the detection switch provided on the circuit substrate. Thus, the third rotary arm 76 is rotated in the direction of the arrow $c_1$ shown in FIG. 8. Further, the third rotary arm 76 becomes the state that the third contact member 78 is contacted with the front surface side of the outer periphery of the optical disc 2. Thus, the optical disc 2 is drawn into the housing 3 while pressing the front surface side of the outer periphery of this optical disc 2.

Figure 9:
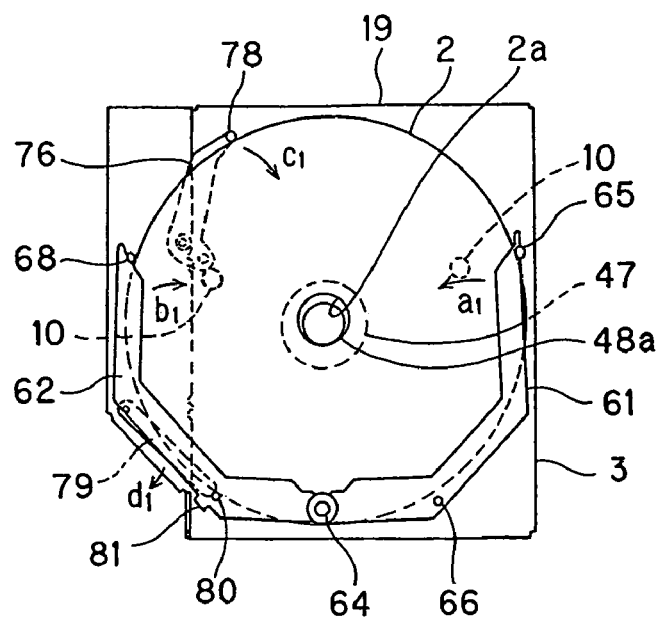
FIG. 9 is a plan view for explaining the operation of the disc drive device and showing the drawing state of the optical disc at a drawing time.

As shown in FIG. 9, when the optical disc 2 is drawn into the housing 3 until the central hole 2a of the optical disc 2 is disposed to the back surface side from a straight line for connecting the first front surface side contact member 65 and the second front surface side contact member 68, the first front surface side contact member 65 and the second front surface side contact member 68 are round about from the back surface side to the front surface side along the outer periphery of the optical disc 2. Then, this time, in the state that the first front surface side contact member 65 and the second front surface side contact member 68 are contacted with the front surface side of the outer periphery of the optical disc 2, the first rotary arm 61 and the second rotary arm 62 are rotated in the direction that the first rotary arm 61 and the second rotary arm 62 are energized by the twist coil spring 70 and approached to each other, that is, rotated in the directions of the arrows $a_1$ and $b_1$ shown in FIG. 9. Thus, the first rotary arm 61 and the second rotary arm 62 draw the optical disc 2 to the disc mounting position shown in FIG. 10, while pressing the front surface side of the outer periphery of the optical disc 2.

Further, the fourth rotary arm 79 is rotated in the direction of the arrow $d_1$ shown in FIG. 9 when the fourth rotary arm 79 is pressed in the state that the fourth contact member 80 is contacted with the back surface side of the outer periphery of the optical disc 2. The fourth rotary arm 79 is contacted with the control piece 81 of the second rotary arm 62 and its rotation becomes a controlled state, when the optical disc 2 is drawn to the disc mounting position shown in FIG. 10.

Figure 10:
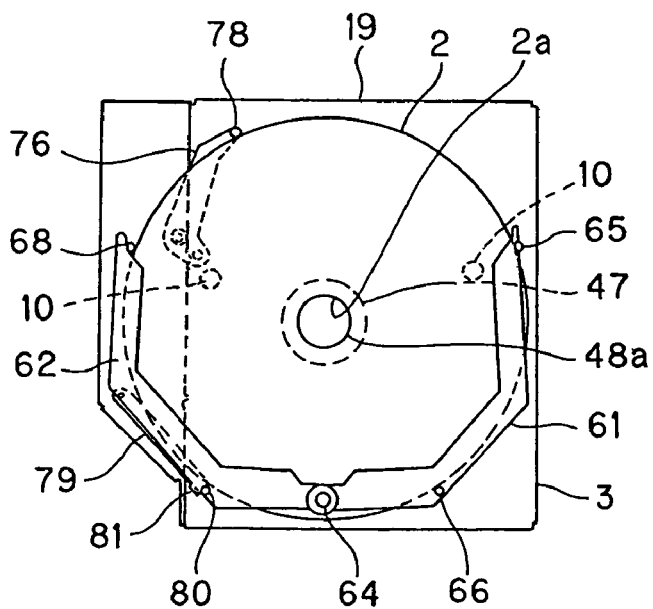
FIG. 10 is a plan view for explaining the operation of the disc drive device and showing the centering state of the optical disc.

As shown in FIG. 10, in the disc drive device 1, when the optical disc 2 is drawn to the disc mounting position, the first rotary arm 61 and the second rotary arm 62 sandwich the optical disc 2 at the inside of the first front surface side contact member 65, the first back surface side contact member 66, the second front surface side contact member 68 and the fourth contact member 80. Thereby, the centering operation for positioning the optical disc 2 to the disc mounting position is performed. That is, the central hole 2a of the optical disc 2 is coincided with the engaging projecting portion 48a of the turntable 47 in the direction crossing perpendicularly with the main surface of the optical disc 2.

Then, in the disc drive device 1, after the centering operation of the optical disc 2, the base elevation mechanism 90 raises the base 45. Thereby, the chucking operation for mounting the optical disc 2 positioned at the disc mounting position on the turntable 47 of the disc mounting portion 41 is performed.

Figure 11:
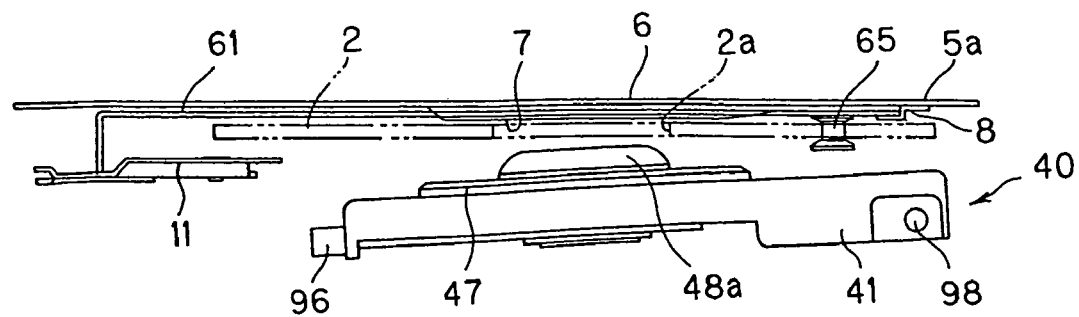
FIG. 11 is a side view for explaining the operation of the disc drive device and showing the state that a base unit is disposed at a chucking releasing position.
Figure 12:
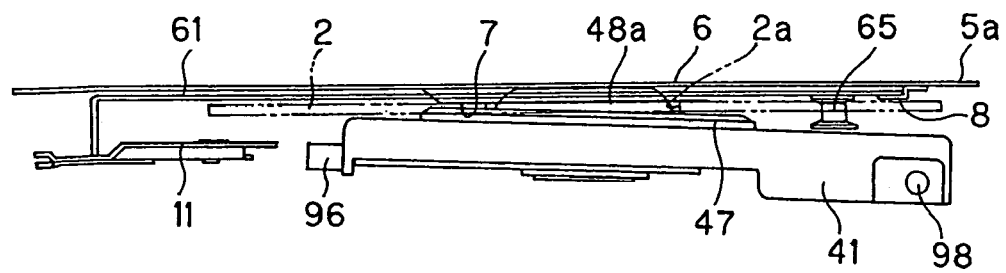
FIG. 12 is a side view for explaining the operation of the disc drive device and showing the state that the base unit is disposed at a chucking position.

More particularly, when the base 45 is raised from the chucking releasing position shown in FIG. 11 up to the chucking position shown in FIG. 12 by the base elevation mechanism 90, the engaging projecting portion 48a is engaged with the central hole 2a of the optical disc 2, by pressing the periphery of the central hole 2a of the optical disc 2 to the contact projecting portion 7 of the top plate portion 5a, while introducing the engaging projecting portion 48a into the central hole 2a of the optical disc 2 positioned at the disc mounting position. Also, in the state that the plurality of the locking pawls 48b lock the periphery of the central hole 2a of the optical disc 2, the optical disc 2 is held on the turntable 47. In the state that the optical disc 2 is held on the turntable 47, the base 45 is lowered to the intermediate position shown in FIG. 13 by the base elevation mechanism 90.

Figure 14:
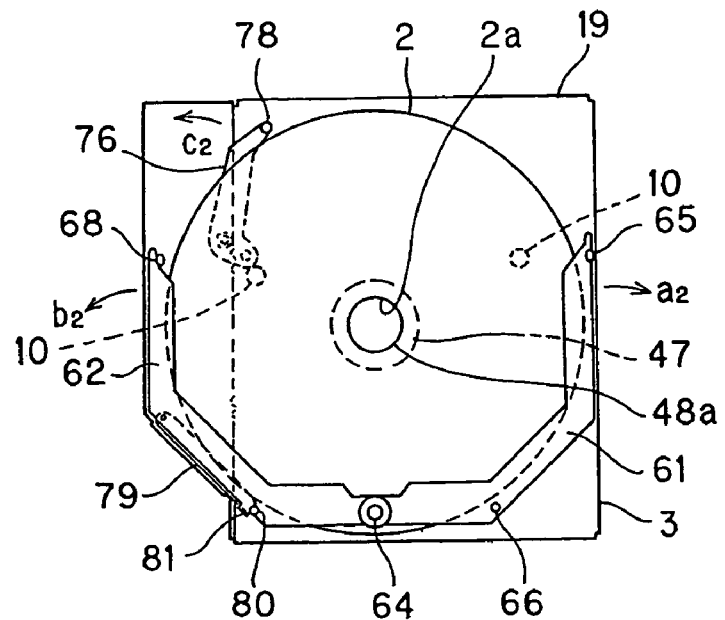
FIG. 14 is a plan view for explaining the operation of the disc drive device and showing the chucking state of the optical disc.

Further, in the disc drive device 1, as shown in FIG. 14, after the chucking operation, the first rotary arm 61 and the second rotary arm 62 are slightly rotated in the direction that the first rotary arm 61 and the second rotary arm 62 separate from each other, that is, in the directions of the arrows $a_2$ and $b_2$ in FIG. 14 in cooperation with sliding to the back surface side of the driving lever 82. At this time, the fourth rotary arm 79 is rotated integrally with the second rotary arm 62 while the fourth rotary arm 79 remains contacted with the control piece 81. Further, the third rotary arm 76 is slightly rotated in the direction of the arrow $c_2$ shown in FIG. 14, in cooperation with the sliding of the driving lever 82 to the back surface side. Thus, it becomes the state that the first front surface side contact member 65, the first back surface side contact member 66, the second front surface side contact member 68, the third contact member 78 and the fourth contact member 80 are separated from the outer periphery of the optical disc 2 held on the turntable 47.

Figure 13:
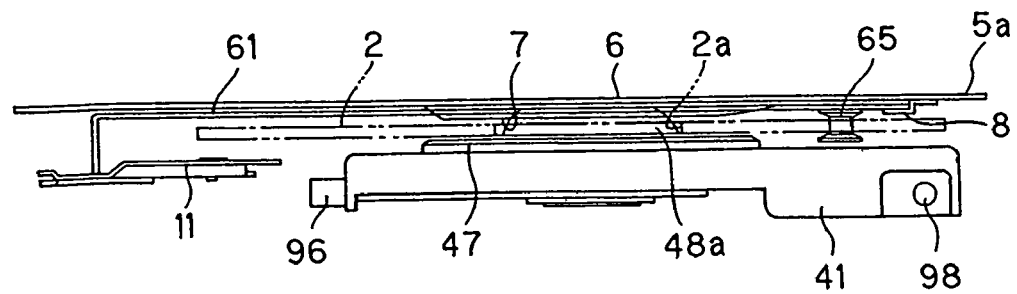
FIG. 13 is a side view for explaining the operation of the disc drive device and showing the state that the base unit is disposed at an intermediate position.

In the disc drive device 1, from the states shown in FIG. 13 and FIG. 14, when a command of recording or reproducing is sent from the personal computer 1000, recording or reproducing of the information signal is performed on or from the optical disc 2 based on this command. More particularly, the spindle motor 49 rotatably drives the optical disc 2 integrally with the turntable 47, and the optical pickup 43 is moved from the outer peripheral side to the inner peripheral side by the pickup feeding mechanism 44. When a focus servo control and a tracking servo control are performed, TOC data recorded on the lead-in region of the optical disc 2 is read. Thereafter, when the information signal is recorded, the optical pickup 43 is moved to a predetermined address in the program area of the optical disc 2 based on the read TOC data. Further, at the information signal reproducing time, the optical pickup 43 is moved to the address in the program area in which designated data is recorded. This optical pickup 43 performs the writing or reading operation of the information signal to the desired recording track of the optical disc 2.

In the disc drive device 1, when the ejection button 21 provided on the front panel 18 is pressed or the ejection command is sent from the personal computer 1000 to the disc drive device 1, first sliding to the front surface side of the driving lever 82 by the displacement drive mechanism is started based on this command.

Figure 15:
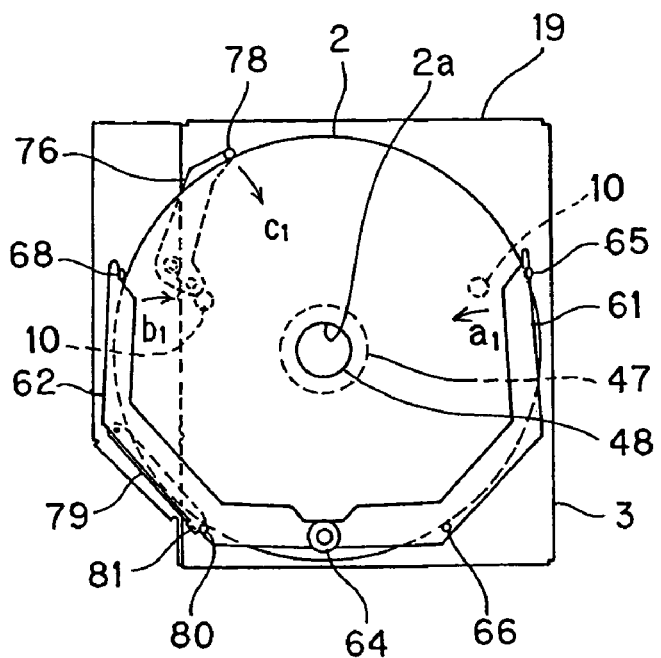
FIG. 15 is a plan view for explaining the operation of the disc drive device and showing the chucking releasing state of the optical disc.

Then, as shown in FIG. 15, the first rotary arm 61 and the second rotary arm 62 are slightly rotated in the direction that the first rotary arm 61 and the second rotary arm 62 approach to each other, that is, the directions of the arrows $a_1$ and $b_1$ shown in FIG. 15, in cooperation with the sliding of the driving lever 82 to the front surface side. At this time, the fourth rotary arm 79 is rotated integrally with the second rotary arm 62 while the fourth rotary arm 79 remains contacted with the control piece 81. The third rotary arm 76 is slightly rotated in the direction of the arrow $c_1$ shown in FIG. 15, in cooperation with sliding of the driving lever 82 to the front surface side.

Thus, the first front surface side contact member 65, the first back surface side contact member 66, the second front surface side contact member 68, the third contact member 78 and the fourth contact member 80 are contacted with the outer periphery of the optical disc 2 held on the turntable 47.

In the disc drive device 1, the base elevation mechanism 90 lowers the base 45 to the chucking releasing position. Thereby, the engagement of the turntable 2a of the disc mounting portion 41 with the locking pawl 48b of the engaging projecting portion 48a is released. The base 45 is released from the turntable 47.

Figure 16:
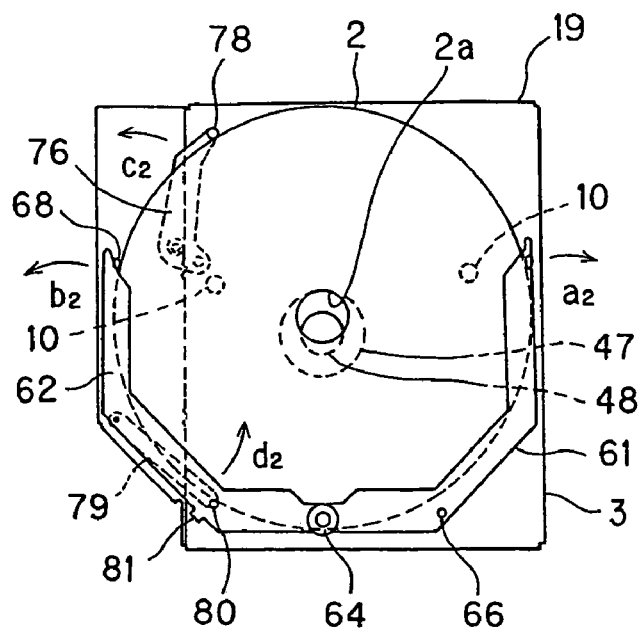
FIG. 16 is a plan view for explaining the operation of the disc drive device and showing the ejection starting state of the optical disc.

In this disc drive device 1, the ejection operation for discharging the optical disc 2 disposed in the disc mounting portion 41 from the disc insertion/removal slot 19 to the outside of the housing 3 is performed. More particularly, when the optical disc 2 is discharged from the disc insertion/removal slot 19 of the housing 3, first, as shown in FIG. 16, the fourth rotary arm 79 is rotated in the direction of the arrow $d_2$ shown in FIG. 16, in cooperation with the sliding of the driving lever 82 to the front surface side. Further, the fourth rotary arm 79 presses the optical disc 2 to the outside of the housing 3 while pressing the back surface side of the outer periphery of this optical disc 2, when the fourth rotary arm 79 becomes the state that the fourth contact member 80 is contacted with the back surface side of the outer periphery of the optical disc 2.

Figure 17:
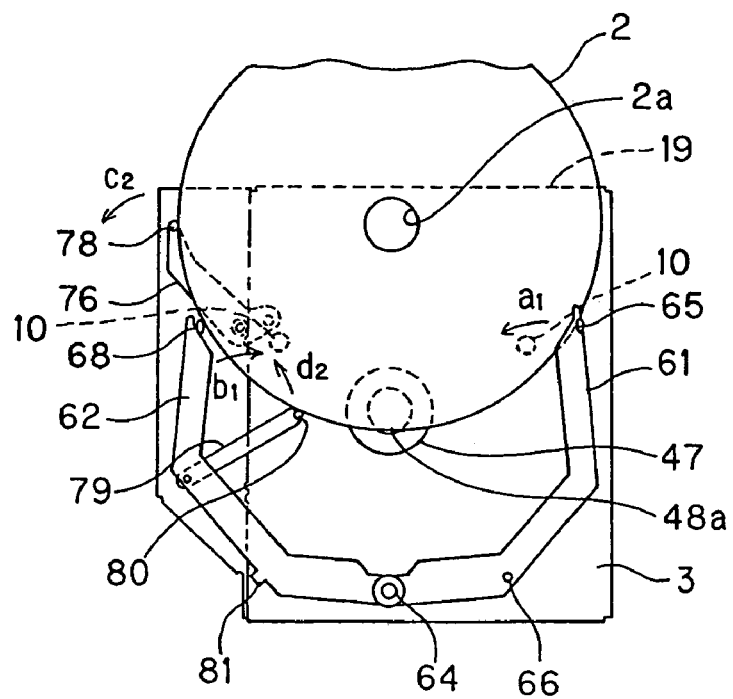
FIG. 17 is a plan view for explaining the operation of the disc drive device and showing the pushing out state of the optical disc at discharging time.

As shown in FIG. 17, when the optical disc 2 is discharged to the outside of the housing 3 until the central hole 2a of the optical disc 2 is disposed at the front surface side from a straight line for connecting the first front surface side contact member 65 and the second front surface side contact member 68, the first front surface side contact member 65 and the second front surface side contact member 68 are round about from the front surface side to the back surface side along the outer periphery of the optical disc 2. Then, this time, in the state that the first front surface side contact member 65 and the second front surface side contact member 68 are contacted with the back surface side of the outer periphery of the optical disc 2, the first rotary arm 61 and the second rotary arm 62 are rotated in the direction that the first rotary arm 61 and the second rotary arm 62 are energized by the twist coil spring 70 and approached to each other, that is, the directions of the arrows $a_1$ and $b_1$ shown in FIG. 17. Thus, the first rotary arm 61 and the second rotary arm 62 are pressed to the disc insertion/removal position shown in FIG. 18, that is, the position that the central hole 2a of the optical disc 2 is exposed to the outside of the housing 3 from the disc insertion/removal slot 19, while pressing the back surface side of the outer periphery of the optical disc 2.

Incidentally, the third rotary arm 76 is rotated in the direction of the arrow $c_2$ shown in FIG. 17, in such a manner that the third contact member 78 is contacted with the outer periphery of the optical disc 2.

Figure 18:
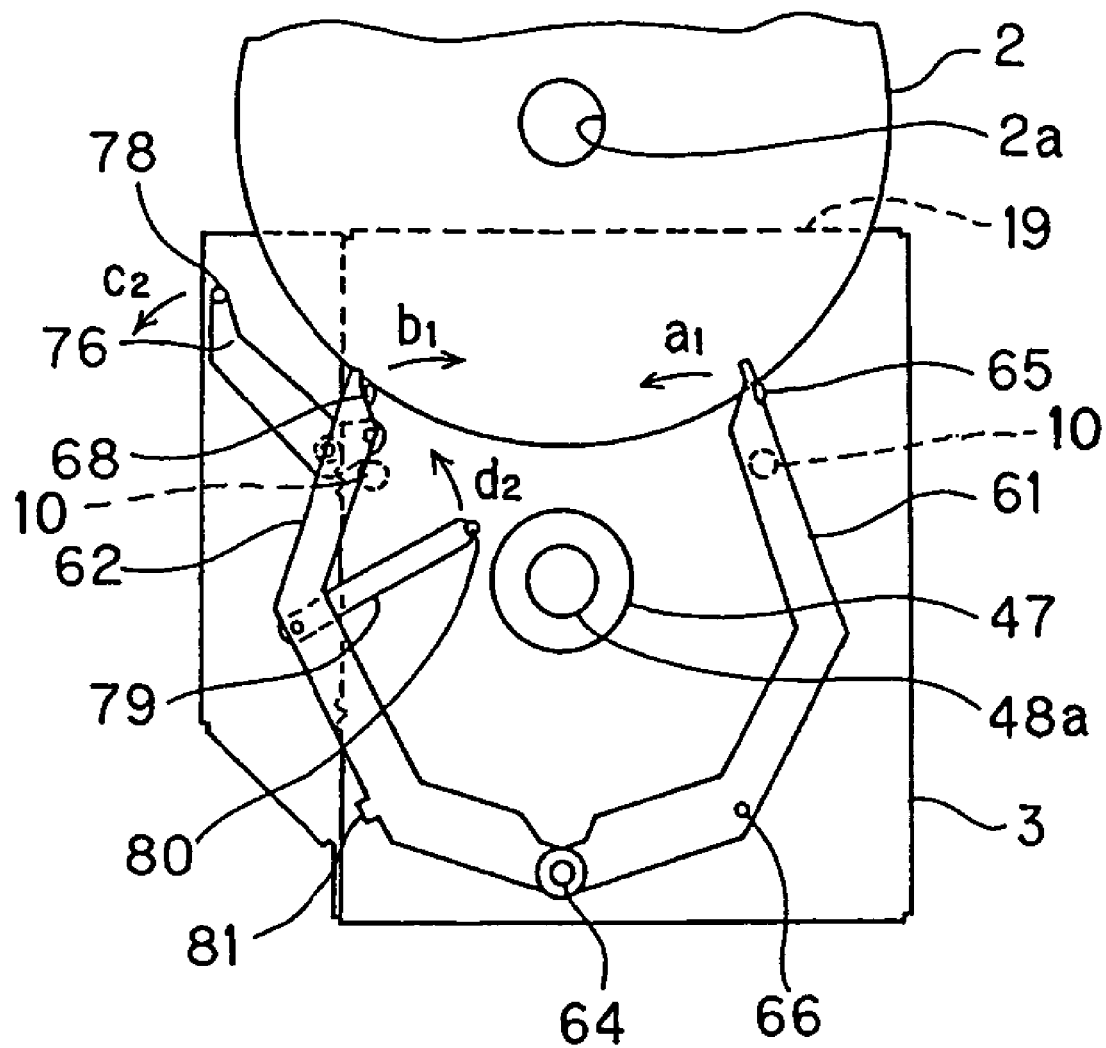
FIG. 18 is a plan view for explaining the operation of the disc drive device and showing the ejection state of the optical disc.
Figure 19:
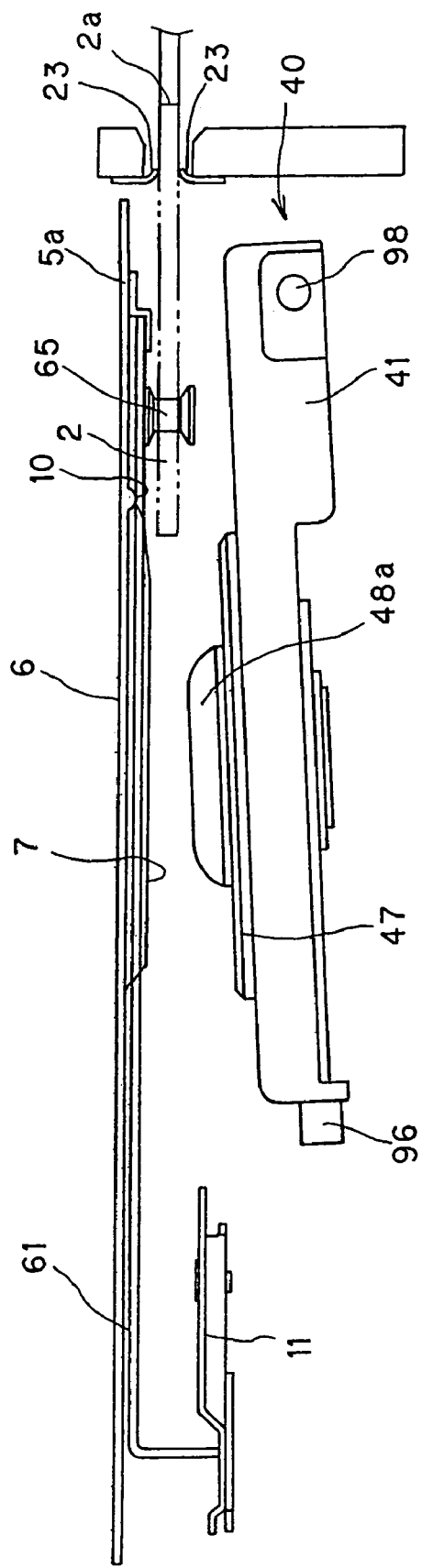
FIG. 19 is a side view for explaining the operation of the disc drive device and showing the ejection state of the optical disc.

As described above, the respective optical discs 2 pressed to the disc insertion/removal position by the first rotary arm 61 and the second rotary arm 62 are discharged out of the housing 3 from the disc insertion/removal slot 19 of the front panel 18. At this time, when the first rotary arm 61 and the second rotary arm 61 are rotated in the directions of the arrow $a_1$ and the arrow $b_1$ for discharging the optical disc 2, as shown in FIG. 18 and FIG. 19, the upper surfaces of the arm bodies 61a and 62a are contacted with the control projecting portions 10 projected to the top plate portion 5a of the top cover 5. Therefore, the energizing force of the twist coil spring 70 for rotating the first and second rotary arms 61 and 62 in the direction of the arrow $a_1$ and the direction of the arrow $b_1$ in FIG. 4 is suppressed. If various optical discs 2 having different thicknesses and weights are used, projecting of the optical disc 2 is prevented, and the optimum projecting amount can be achieved.

Thus, as shown in FIG. 2, the optical disc 2 is discharged to the position that the central hole 2a is approached from the disc insertion/removal slot 19 to the outside. A user can grasp the central hole 2a of the optical disc 2 approached from the disc insertion/removal slot 19 and the outer periphery of the disc. Then, the user can take out the optical disc 2 easily from the disc drive device 1 without contacting with a recording area.

The present invention is not limited to that applied to the slot-in type disc drive device 1 mounted in the above-mentioned laptop personal computer 1000, but can be applied widely to domestic, on-vehicle disc drive device, a game unit, etc., for recording and/or reproducing an information signal on/from the optical disc.

It should be understood by those skilled in the art that various modifications, combinations, sub-combinations and alternations may occur depending on design requirements and other factors insofar as they are within the scope of the appended claims or the equivalents thereof.

What is claimed is:

1. A disc drive device comprising:
   a housing having a bottom case and a top cover and formed with a disc insertion/removal slot for inserting or discharging an optical disc;
   a disc mounting portion for rotatably holding the optical disc inserted into the housing;
   a disc rotary drive mechanism configured to rotatably drive the optical disc held in the disc mounting portion;
   an optical pickup configured to record and/or reproduce an information signal to/from the optical disc rotatably driven by the disc rotary drive mechanism;
   a pickup moving mechanism for moving the optical pickup in a radial direction of the optical disc; and
   a disc conveying mechanism formed with a supporting portion to support the outer peripheral surface of the optical disc, and having a plurality of narrow, elongated arms rotatably supported in the housing, and an energizing member for rotatably energizing the plurality of the rotary arms in a predetermined direction, and conveying the optical disc between a disc mounting position for holding the optical disc inserted into the housing in the disc mounting portion and a disc insertion/removal position for inserting/removing the optical disc, the top cover having a control projection configured to control a rotary region of the plurality of rotary arms which energizes the optical disc in the discharging direction by contacting with the plurality of the rotary arms supporting the outer peripheral surface of the optical disc.

2. The disc drive device according to claim 1, wherein the control portion is integrally molded with the top cover or attached to the top cover.

* * * * *